July 3, 1934.  H. E. LIPPERT  1,964,764
FOOT CONTROL FOR MOTOR VEHICLES
Original Filed Dec. 6, 1928   2 Sheets-Sheet 1

INVENTOR
Henry E. Lippert

July 3, 1934.
H. E. LIPPERT
1,964,764
FOOT CONTROL FOR MOTOR VEHICLES
Original Filed Dec. 6, 1928    2 Sheets-Sheet 2
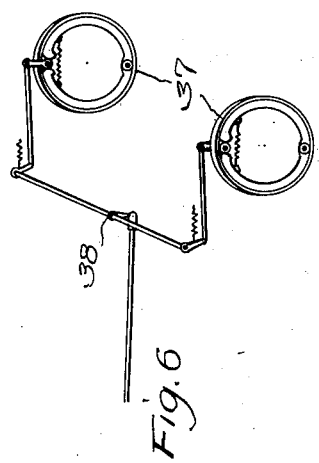
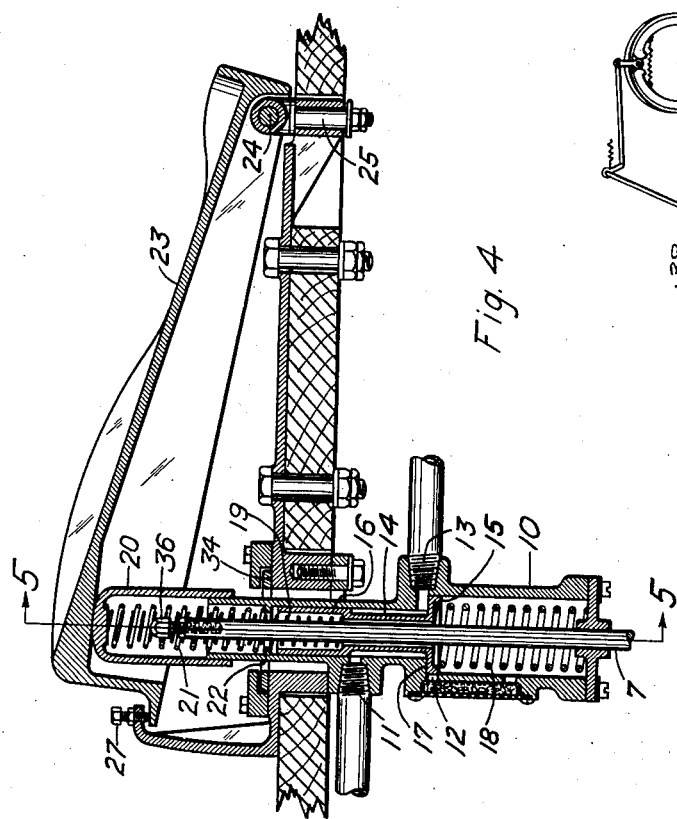
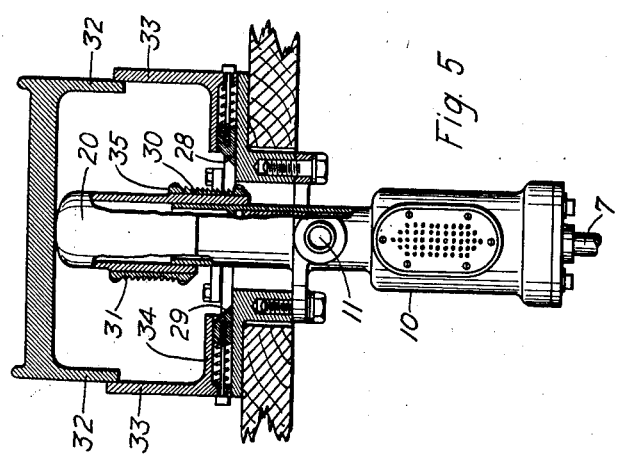
INVENTOR
Henry E. Lippert Patented July 3, 1934

1,964,764

UNITED STATES PATENT OFFICE 1,964,764

FOOT CONTROL FOR MOTOR VEHICLES

Henry E. Lippert, Pittsburgh, Pa.

Application December 6, 1928, Serial No. 324,275
Renewed August 12, 1933

19 Claims. (Cl. 192—3)

This invention relates to an improved foot control mechanism for operating both the accelerator and the brakes of a motor vehicle, and pertains particularly to an improved foot control mechanism for operating both the accelerator and fluid pressure actuated brakes of a motor vehicle.

An object of the invention is to simplify and make more reliable the controlling of a motor vehicle by combining the acceleration and retardation means into one unit for preventing the necessity of shifting the foot to various positions as in present motor vehicles.

Another object of the invention is the provision of means operated by the foot for holding the accelerator and brake controlling mechanism at various positions so that a desired uniform speed or braking pressure of the motor vehicle is maintained.

Another object of the invention is the provision of means, with a common accelerator and brake pedal, for rendering the brake inoperative by said pedal, so that the pedal can be used as an accelerator only.

Another object of the invention is the provision of means, with a common accelerator and brake pedal, for limiting the maximum braking pressure.

Another object of the invention is the provision of a compact unit for controlling the accelerator and brakes of a motor vehicle, that can readily be installed to any design of motor vehicle, that is inexpensive to manufacture, and that will not require any complicated lever and rod construction.

Other objects and advantages will be apparent during the course of the following description.

Similar reference characters in the different figures of the accompanying drawings indicate corresponding elements or features of construction herein referred to.

Fig. 1 in the drawings illustrates a fragmentary elevational view of a motor vehicle equipped with an embodiment of the invention, and is more or less diagrammatic Fig. 2 is a sectional view of the foot control illustrating the position of parts when the control is in its neutral position.

Fig. 4 is a sectional view of the foot control illustrating the position of parts when the control is in its highest position, and shows also a preferred foot pedal.

Fig. 5 is a part sectional view taken on line 5—5 of Figure 4 and illustrates the means for holding the foot control at various positions.

Fig. 6 illustrates the usual braking mechanism associated with the wheels of a motor vehicle, but the design of said mechanism forms no part of the present invention.

Figure 1:
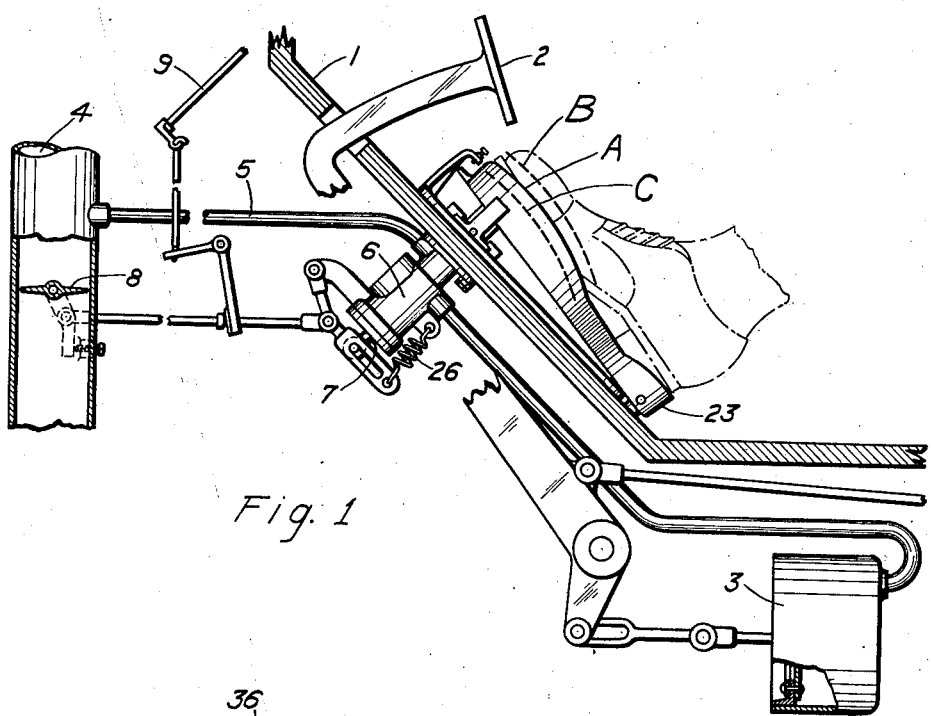

In Figure 1 the numeral 1 represents the footboard or floor of an automobile, (2) the usual brake pedal that may be operated manually or by the fluid motor 3, to apply the brakes 37 by means of the lever and rod construction 38. The fluid motor 3 is actuated by the suction created in the manifold 4 of the vehicle engine (not shown) and is connected to the manifold 4 by the conduit 5. Inserted in the conduit 5 is a brake control valve 6 located at the underside of the footboard 1. Extending through the center of the valve 6 is the accelerator or plunger 7 for controlling the throttle valve 8 which is provided with the usual "idling" adjustment. The numeral 9 represents the hand operated accelerator which also controls the throttle valve 8.

The neutral position of the operator's foot and a foot pedal 23 is designated by the letter A. When the foot is in the A position the vehicle is neither being accelerated or retarded. Upward movement of the foot from the position A to the position designated by the letter B applies the brakes. When the foot is in the B position maximum pressure is being applied to the brakes. Downward movement of the foot from the position A to the position designated by the letter C accelerates the vehicle. When the foot is in the C position maximum explosive mixture is being supplied to the engine.

Figures 2, 3:
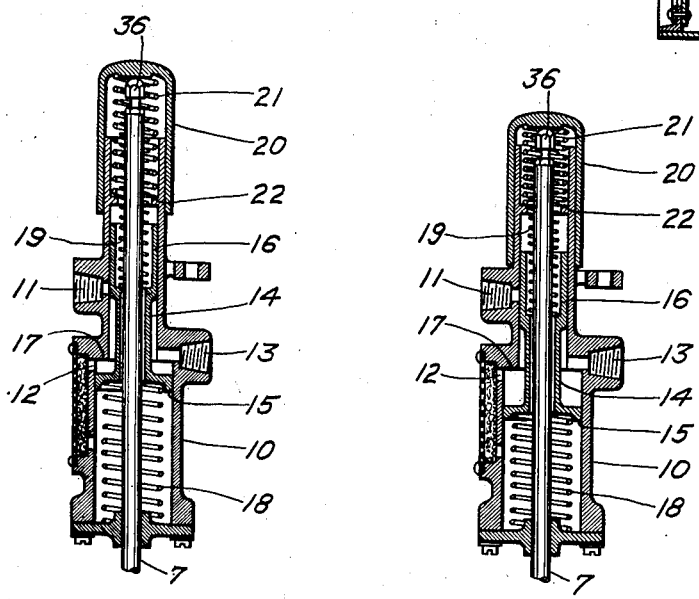
Fig. 3 is a sectional view of the foot control illustrating the position of parts when the control is in its lowest position.

Referring to Figure 2 of the drawings it will be seen that the valve 6 comprises a housing or casing 10, having the upper port 11 in communication with the manifold 4. (I have shown and described my invention in connection with the manifold of the engine but any source of vacuum can be used.) The lower port 12 is in communication with the air. The port 13, located between the ports 11 and 12, is in communication with the fluid motor 3. A spool valve 14 is slidably mounted in the casing 10 and makes communication between the fluid motor port 13 and the vacuum and air ports 11 and 12, respectively. The diameter of the lower end 15 of the valve 14 is greater than that of the upper end 16, and the upward movement of the valve 14 is limited by the lower end 15 coming in contact with the shoulder 17 of the valve casing. A spring 18 for supporting the valve is positioned between the underside of the valve 14 and the casing 10, and tends to hold the valve 14 in its brake applied position. A spring 19 is positioned between the top of the valve 14 and the telescopically mounted plunger 20 for moving the valve 14. A spring 21 is positioned between the shoulder 22 in the upper end of the valve casing 10 and the plunger 20 for carrying the weight of said plunger and the foot lever or pedal 23. The plunger 20 is interposed between the accelerator 7 and the pedal 23. The foot pedal 23 is entirely above the vehicle floor, it has the general outline of a human foot and is pivoted or hinged at the heel end. By pivoting the pedal at the heel end the operator's foot is not required to move at as great an angle as would be necessary if the pedal were pivoted at the center.

When the operator actuates the foot pedal 23 from the B to C position the valve 14 is moved from the position shown in Figure 4 to that shown in Figure 3. Referring to Figure 4 of the drawings it will be noted that the fluid motor port 13 is in direct communication with the vacuum port 11 and that the air port 12 is closed. Thus maximum pressure is being applied to the brakes. To release the brakes and accelerate the vehicle the operator merely forces down the plunger 20 by means of the foot pedal 23 until the tension of spring 19 is sufficient to overcome the power of spring 18 and the atmospheric pressure on the underside of the valve head 15, thus moving the valve 14 down. This downward movement of valve 14 closes the vacuum port 11 and opens the air port 12 which admits air into the fluid motor 3 and releases the brakes. When the vacuum port 11 is completely closed the brakes are entirely released and the plunger 20 is in a position to actuate the accelerator 7. This position corresponds to Figure 2 of the drawings. Further downward movement of the plunger 20 will result in the throttle valve 8 being opened by the accelerator 7, but further downward movement of the valve 14 has no effect on any port. By releasing the pressure applied by the foot on the plunger 20 the spring 26 urges the accelerator to its upward position and closes the throttle valve 8. By releasing the pressure applied by the foot on the plunger 20 still more, the spring 18 urges the valve 14 upward thus closing the air inlet port 12 and opening the vacuum port 11 which withdraws air from the fluid motor 3 and applies the brakes. From this paragraph it can be seen that one upward movement of the foot away from the footboard will first cut off the gas supply to the engine and then apply the power brake.

It has been found that a power brake locks the wheels of a vehicle very readily. Also it is a very difficult task to get the brake bands of the vehicle adjusted the same. Therefore I have provided an adjustment 27 above the vehicle floor to contact with the pedal 23 for varying and limiting the upward movement of the foot control pedal 23 so that a desired maximum braking pressure can be predetermined and maintained. As the brake bands wear the maximum braking pressure decreases. By unscrewing the adjustment 27 the brake applying range of movement of the foot control pedal 23 is increased to raise and the maximum braking pressure is thus increased. When the vacuum port 11 is fully opened the greatest maximum braking pressure is obtained.

Sometimes it is desirable to set the accelerator so that a constant speed is maintained or to retard the vehicle with a constant braking pressure. For this purpose I have provided the sliding latches 28 and 29 which engage the racks 30 and 31 respectively, on the plunger 20, when the foot control pedal 23 is moved laterally in opposite directions. The downwardly extending sides 32 on the foot control pedal 23 engage the upwardly extending lugs 33 on the latch casing 34 thereby shifting the latches. By engaging the latch 28 in the rack 30 a desired constant braking pressure is maintained. By engaging the latch 29 in the rack 31 a desired constant speed of the vehicle is maintained.

Occasionally it is desirable to actuate the throttle valve with the hand control and move the feet about for relaxation. Therefore a means of preventing the plunger 20 from moving above the neutral position, which would apply the brakes, is needed. This is provided for in the following manner. When the plunger 20 is between the A and C positions the rack 30 will be below the latch 28. Thus, if the latch 28 is moved toward the plunger 20 as to engage the latch 30 and the plunger 20 moves upward, the latch 28 will engage the shoulder 35 and prevent any further upward movement thereby rendering the brake inoperable by the plunger 20 and pedal 23.

Referring to Figure 2 of the drawings it will be noted that the plunger 20 is in a position to actuate the accelerator 7. In the previous paragraph it was explained how the plunger 20 was held in the position illustrated in this figure. Therefore lengthening or shortening the accelerator 7 by means of an adjustment 36 will vary the "idling" position of the throttle valve 8.

I have shown and described what I believe is the preferred construction of my invention, but those skilled in the art may see various improvements, so I do not regard the invention as limited to the construction illustrated and described, except insofar as I have included such limitations within the terms of the following claims.

Having now described my invention, what I claim as new is:

1. In combination with a motor vehicle, a throttle valve, a brake, a common foot pedal for controlling said throttle valve and said brake, means operated by movement of a foot of the vehicle operator in one direction for maintaining a setting of said throttle valve, and means operated by movement of the operator's foot in another direction for maintaining a constant applied brake pressure.

2. In combination with a motor vehicle, a throttle valve, a brake, a common pedal for controlling said throttle valve and said brake, means operated by movement of a foot of the vehicle operator in one direction for maintaining a setting of said throttle valve, and means operated by movement of the operator's foot in another direction for maintaining a constant applied brake pressure.

3. In a motor vehicle, a fluid pressure operated brake, a brake control valve comprising a casing having ports, a spring supported valve within said casing for controlling communication between the ports, and a spring supported means for operating said last named valve, said ports and last named valve being so related as to release the brake when depressed by said means and to apply the brake when released by said means.

4. In combination with a motor vehicle, a throttle valve, a brake, a common control for actuating said throttle valve and said brake, means for varying and limiting the range of travel of said control thereby varying and limiting the maximum braking pressure, and means for maintaining a setting of said throttle valve.

5. In combination with a motor vehicle having a floor, a throttle valve, a brake, a common pedal for actuating said throttle valve and said brake, means above the vehicle floor for limiting the maximum braking pressure obtained by actuation of said pedal, and means for maintaining a setting of said throttle valve.

6. In combination with a motor vehicle having a floor, a throttle valve, a brake, a common pedal for controlling said throttle valve and said brake, and adjustable means above the vehicle for predetermining and limiting the maximum braking pressure obtained by actuation of said pedal.

7. In combination with a motor vehicle, a brake, a pedal for actuating said brake, and means arranged to contact said pedal for limiting the maximum braking pressure.

8. In combination with a motor vehicle, a brake, a pedal for actuating said brake, and adjustable means arranged to contact said pedal for varying and limiting the maximum braking pressure.

9. In a motor vehicle, a throttle valve having an idling adjustment associated therewith, a brake, a common pedal for opening said throttle valve by a depression from a neutral position and for applying said brake by a release from said neutral position, means for preventing said pedal from moving above said neutral position thereby rendering said pedal a throttle valve actuator only, and adjustable means associated with said pedal for limiting the movement of said throttle valve.

10. In combination with a motor vehicle, an accelerator, a fluid pressure operated brake, a control pedal, a means interposed between said pedal and said accelerator for controlling said brake, and means for causing said brake to be inoperable by said pedal.

11. In combination with a motor vehicle, an accelerator, a fluid pressure operated brake, a brake control valve, a control pedal, a means interposed between said pedal and said accelerator for operating said valve, and manually operable means for rendering said brake inoperable.

12. In combination with a motor vehicle, a brake, a throttle valve, a pedal for actuating said throttle valve, a means interposed between said pedal and said throttle valve for actuating said brake, and means for causing said brake to be inoperable by said first named means.

13. In combination with a motor vehicle, a fluid pressure operated brake, a brake valve, a throttle valve, means for actuating said throttle valve, means interposed between the first mentioned means and said throttle valve for actuating said brake valve, and manually operable means for rendering said brake valve inoperable.

14. In combination in a motor vehicle having a floor, a common accelerator and brake pedal for accelerating the vehicle by a depression from a neutral position and for applying the brakes by a release from said neutral position, means for rendering said common pedal and accelerator pedal only, and adjustable means above the vehicle floor for varying and limiting the maximum braking pressure obtained by actuation of said common accelerator and brake pedal.

15. In combination in a motor vehicle having a floor, a throttle valve, a fluid pressure operated brake, a brake valve, means for actuating said throttle valve and said brake valve, means above the vehicle floor for limiting the travel of said brake valve, and means operated by the vehicle operator's foot for causing said brake valve to be inoperable by the first said means.

16. In combination in a motor vehicle having a floor, means of acceleration, means of retardation, a common foot pedal for actuating one of said means by a depression thereof and the other said means by a release thereof, means operated by a lateral movement of the vehicle operator's foot for causing said means of retardation to be inoperable by said common foot pedal, and manually adjustable means above the vehicle floor for limiting the maximum degree of retardation.

17. In combination in a motor vehicle, a throttle valve, a brake, a common pedal for opening said throttle valve by a depression thereof and for applying said brake by a release thereof, means operated by the vehicle operator's foot for causing the brake to be inoperable by said pedal, and means including latch mechanism for maintaining a setting of said throttle valve.

18. In a motor vehicle having a floor, a throttle valve, an accelerator, a vacuum operated motor, a source of suction, a valve for controlling communication between the vacuum operated motor and the source of suction, means arranged to actuate the last named valve, the accelerator and said means being separate from each other, movable on parallel lines, and extending above the vehicle floor, a common foot operated pedal separate from and mounted to actuate both the accelerator and said means, the throttle valve being opened upon a depression of the accelerator by said pedal, and communication between the vacuum operated motor and the source of suction provided upon a release of said means by said pedal.

19. A control unit for a motor vehicle comprising a plate, a housing secured at one side of said plate at an extremity thereof, an operating plunger positioned within said housing extending through said plate to the opposite side thereof, means yieldably urging said plunger to its extended position, a lever pivoted to said plate and arranged to overlap said plunger, a second plunger movable by said lever, and means yieldably urging said last named plunger to its extended position, each of said plungers being arranged to actuate independent control elements of the vehicle, and said lever being arranged to actuate both plungers without necessitating lateral shifting of the vehicle operator's foot.

HENRY E. LIPPERT.

CERTIFICATE OF CORRECTION.

Patent No. 1,964,764.                                              July 3, 1934.

HENRY E. LIPPERT.

It is hereby certified that error appears in the printed specification of the above numbered patent requiring correction as follows: Page 2, line 16, after "center" insert the following as a part of the paragraph: The horizontal pivot 24 permits the foot pedal 23 to move vertically for controlling the accelerator and brake. The vertical pivot 25, permits the foot pedal 23 to move laterally for a purpose described later in this application.; and line 69, strike out the words "to raise"; page 3, line 15, claim 6, after "vehicle" insert floor; and that the said Letters Patent should be read with these corrections therein that the same may conform to the record of the case in the Patent Office.

Signed and sealed this 7th day of August, A. D. 1934.

Leslie Frazer (Seal)

Acting Commissioner of Patents.